(12) United States Patent
Candelore

(10) Patent No.: US 9,032,494 B2
(45) Date of Patent: May 12, 2015

(54) NETWORK-BASED REVOCATION, COMPLIANCE AND KEYING OF COPY PROTECTION SYSTEMS

(75) Inventor: Brant L. Candelore, San Diego, CA (US)

(73) Assignee: Sony Corporation, Tokyo (JP)

( * ) Notice: Subject to any disclaimer, the term of this patent is extended or adjusted under 35 U.S.C. 154(b) by 326 days.

(21) Appl. No.: 13/293,954

(22) Filed: Nov. 10, 2011

(65) Prior Publication Data
US 2013/0125225 A1 May 16, 2013

(51) Int. Cl.
*G06F 21/00* (2013.01)
*G06F 21/10* (2013.01)
*G06F 21/44* (2013.01)

(52) U.S. Cl.
CPC .............. *G06F 21/10* (2013.01); *G06F 21/445* (2013.01)

(58) Field of Classification Search
CPC ....... G06F 21/10; G06F 21/445; G06F 21/33; G06F 21/606; H04L 63/0428
USPC .................. 726/7; 725/62; 713/170; 380/201
See application file for complete search history.

(56) References Cited

U.S. PATENT DOCUMENTS

| | | | |
|---|---|---|---|
| 2004/0024580 A1* | 2/2004 | Salmonsen et al. | 703/27 |
| 2005/0021469 A1 | 1/2005 | Han | |
| 2005/0257056 A1* | 11/2005 | Morita et al. | 713/170 |
| 2006/0156416 A1 | 7/2006 | Huotari et al. | |
| 2008/0112405 A1 | 5/2008 | Cholas et al. | |
| 2008/0141313 A1* | 6/2008 | Kato et al. | 725/62 |
| 2009/0097645 A1* | 4/2009 | Harris | 380/201 |

OTHER PUBLICATIONS

Lee, Yun-Kyung et al., Home Device Authentication Method Based on PKI, IEE publication, Jan. 7, 2008.

* cited by examiner

*Primary Examiner* — Syed Zaidi
(74) *Attorney, Agent, or Firm* — Miller Patent Services; Jerry A. Miller

(57) ABSTRACT

A method of authenticating a device involves establishing a local connection between a local target device and a local source device; at the source device, obtaining credentials of the target device via the local connection; at the source device, sending the credentials to a cloud authentication server via a secure communication channel; at the cloud authentication server, checking the credentials of the target device against a database of known good devices; at the source device, receiving a message from the cloud authentication server via the secure communication channel, said message indicating that the target device is authenticated; and delivering content from the source device to the target device on the condition that the target device is authenticated. This abstract is not to be considered limiting, since other embodiments may deviate from the features described in this abstract.

20 Claims, 11 Drawing Sheets

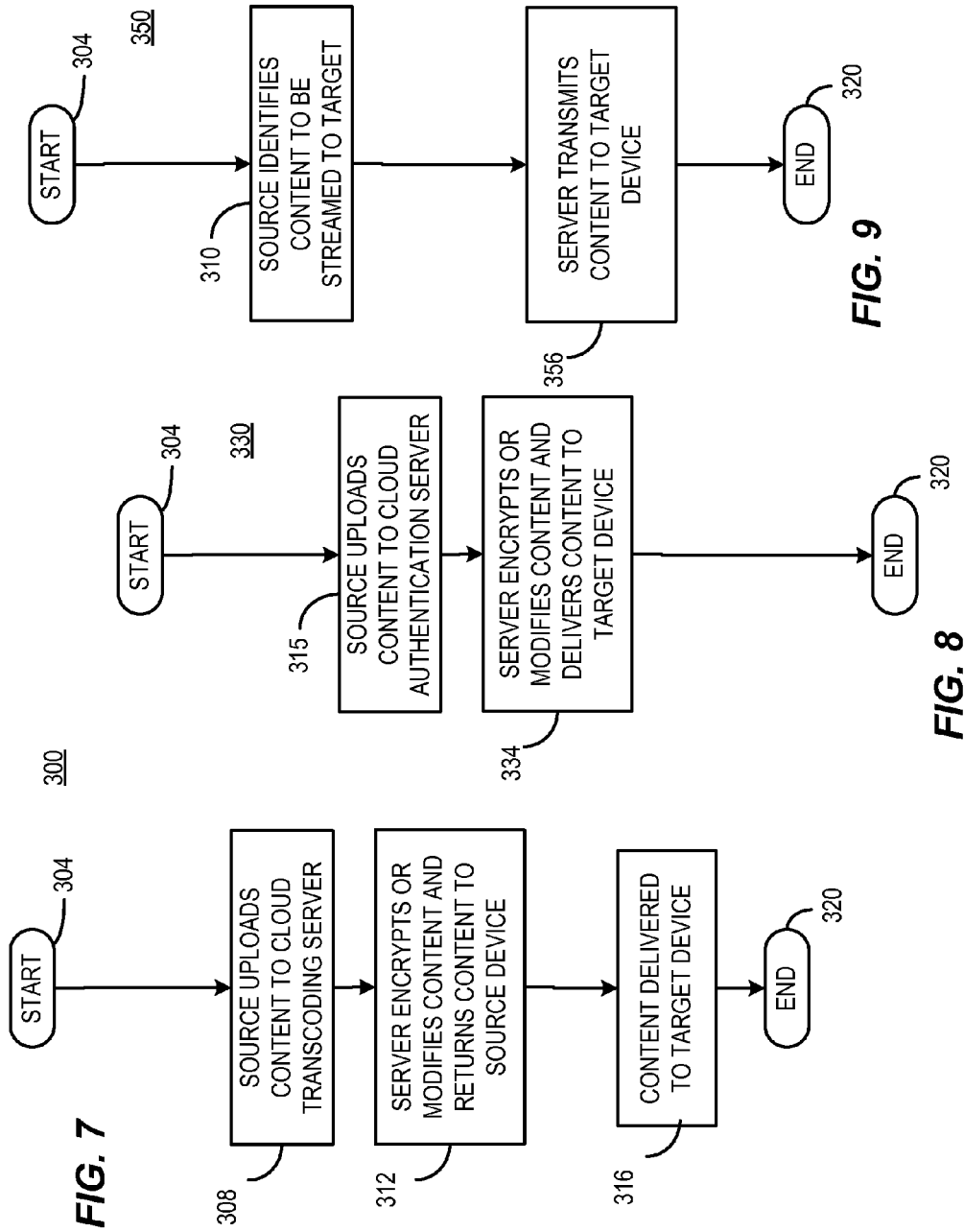

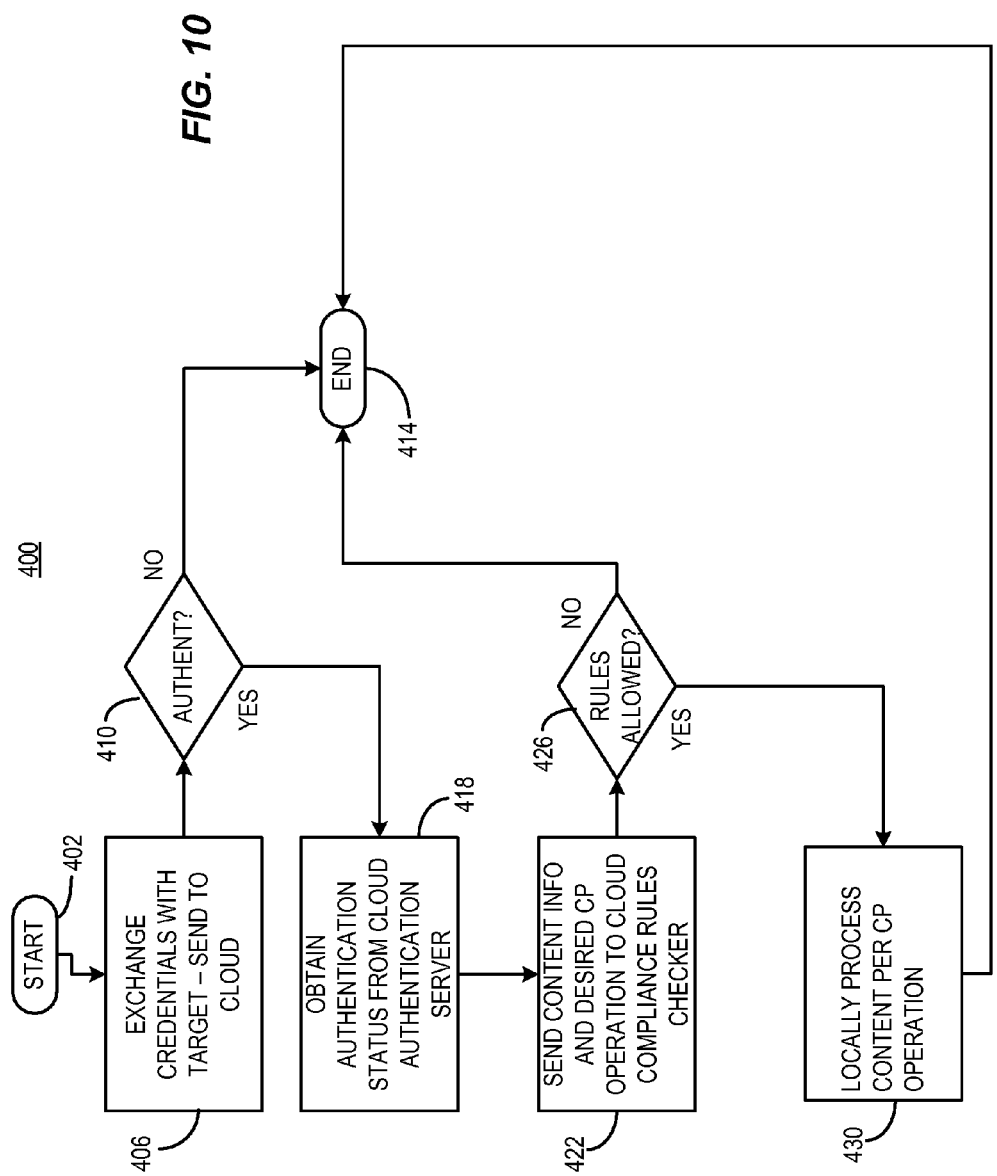

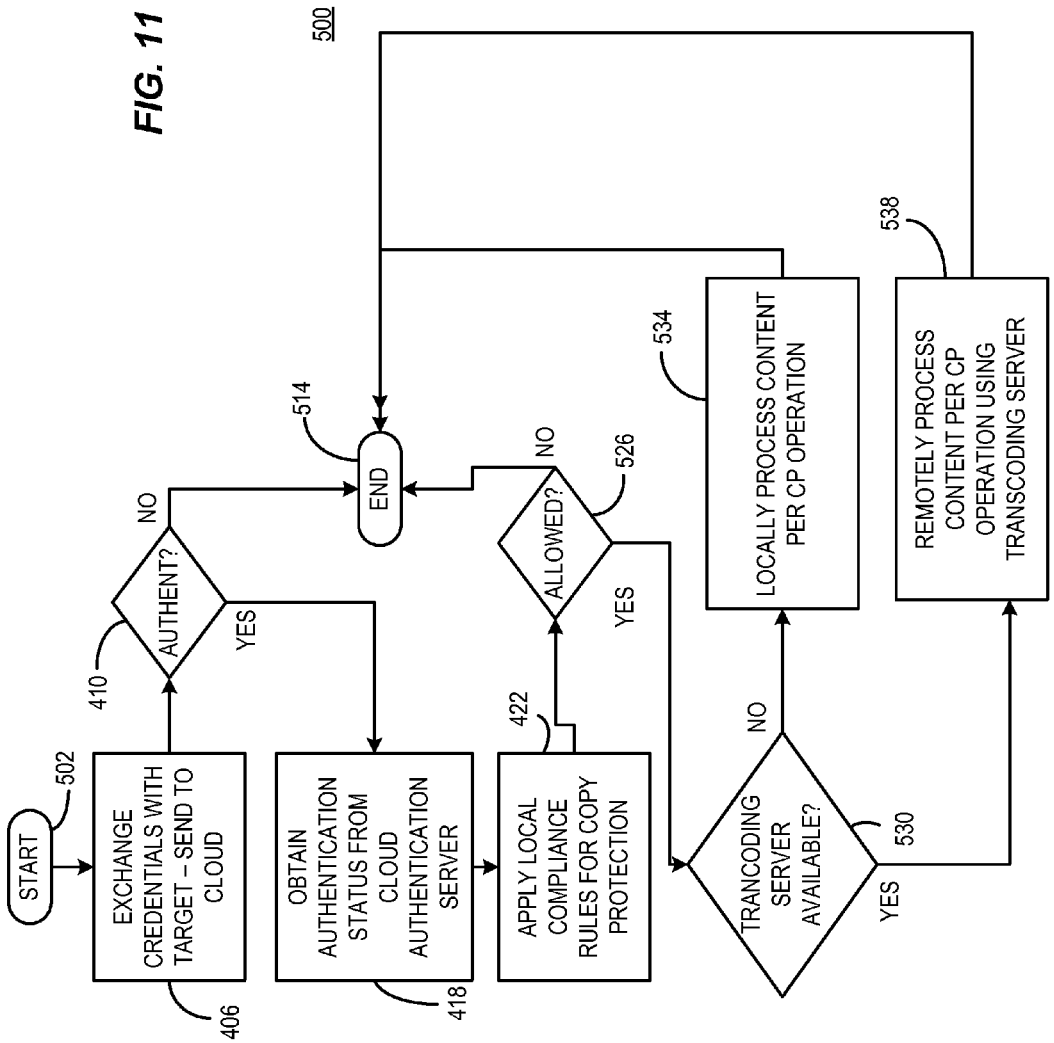

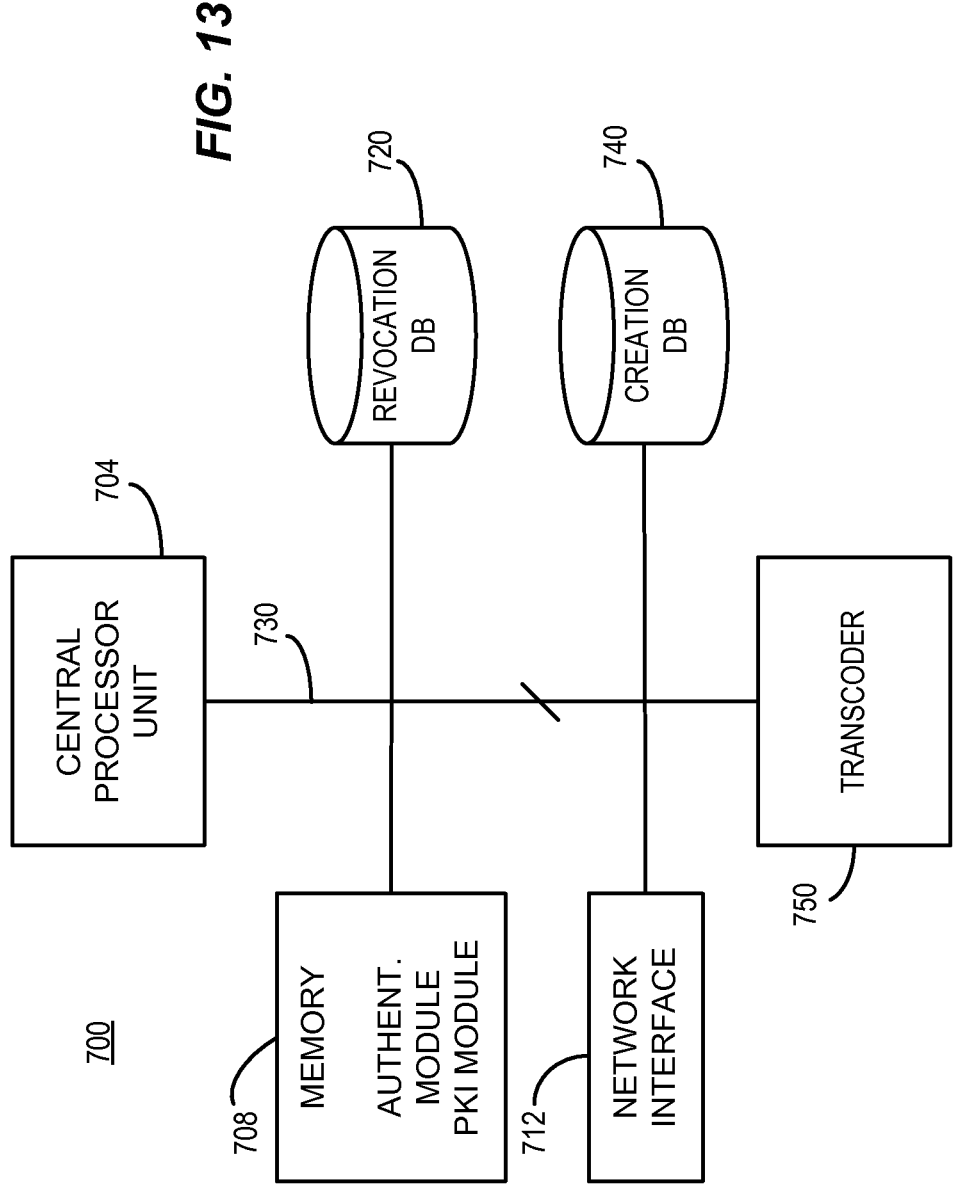

NETWORK-BASED REVOCATION, COMPLIANCE AND KEYING OF COPY PROTECTION SYSTEMS

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Home networking standards, such as the Universal Plug and Play (UPnP) and Digital Living Network Alliance (DLNA), have been developed to facilitate the interconnection of media devices in the home. The UPnP and DLNA specifications and guidelines allow for the discovery of content, and the transfer of content from, for example, a Digital Media Server (DMS) to a Digital Media Renderer (DMR) or Digital Media Player (DMP). With DLNA, when copy protected content is exchanged between two interconnected devices such as a DMS and a DMP, Digital Transmission Copy Protection over IP (DTCP-IP) or Windows Media Digital Rights Management for Network Devices (WMDRM-ND) may be used for device authentication and link protection. A DMP, e.g. a set-top box, may output to a Digital Media Renderer (DMR) over a High bandwidth Digital Multimedia Interface (HDMI) using High Definition Copy Protection (HDCP). This permits the copyright owner(s) to control access to their content.

In one scenario, as depicted in FIG. 1, this is accomplished when a source device such as a DMS 20 is connected to a sink device such as a DMP 24 and there is a request to transfer content in some way (e.g., streaming) from the source device 20 to the sink (target) device 24 via an interconnection 16. In this example, both devices are connected together in close proximity such as within a home 26 or home entertainment network. The physical infrastructure could be, for example, a wireless Local Area Network (WLAN), Power-line Communications (PLC) or Multimedia over Coax Alliance (MoCA). Internet Protocol (IP) is used for transporting the media content.

Pay Content is typically managed and transferred according to the compliance rules 12 and 22 of the protection technologies employed at different points of the distribution in such known systems. For example, conditional access (CA) systems may be used to get the content from a content provider broadcast center to a set-top box acting as a DMS. The content may be then recorded to a local hard disk drive or streamed to a DMP. When recording the content, broadcast content is usually CA descrambled and re-scrambled with local copy protection, e.g. DTCP-IP, WMDRM-ND or other technology such as DRM copy protection 28.

So called "Over-the-top" (OTT) content may be delivered from the service provider already DRM encrypted. OTT content may be recorded or streamed in the home with the delivered DRM encryption without the CA decryption step. Content may be streamed so long as the target device 24 is not on a revocation list 32 stored at the source device. In some scenarios, e.g. DTCP-IP, the target device may also check to see if the source device is on a revocation list 32. This prevents a compromised source device from interoperating with non-compromised target devices. This revocation list 32 may be updated over the Internet 40 via an Internet connection 44 from a revocation database 36. However, this implementation is of limited utility due to the practical size limitations of the memory (not shown) of the source device and the large number of devices which might need to be revoked. In addition, in some cases, the updated revocation list may be blocked by the user from being received by the source device. Moreover, most such source devices do not have the ability to readily update their revocation list in a timely manner.

It should be mentioned that revocation lists are only good for certain types of security breaches where the security identity and credentials of a particular device are cloned to other devices. If this compromised identity can be discovered, e.g. by law enforcement personnel, then it can be placed in a revocation list that can be checked. But in some security breaches, it may not be possible to revoke devices because it was not an identity of a device that was compromised. For example, it might be the software implementation that allows improper behavior, e.g. copying of content that was supposed to be only streamed and then discarded.

In another example, the identity of the offending device might be synthetized at will. This might be possible, for instance if a certificate authority which signs public key certificates, were to have a private key that was breached and widely circulated. Device certificates could then be created easily by non-authorized persons. While not a breach of a certificate authority, in a real live hacking case, in 2009, it was revealed that HDCP public and private keys, widely used for the HDMI link identities, could be created at will. HDCP did not use a standard public/private key architecture, for example, using RSA or elliptic curve cryptography or any other suitable cryptography. The mathematics involved in the HDCP breach will not be explained here, but the software to create HDCP identities was published on the Internet. In such a situation, it might be impossible to detect all the fraudulent identities against a revocation list 32 due to practical storage limitations. There could be a huge number. But since they would be easy to create, they could be created and used privately. They may be undetectable. It is when a special hacking device is marketed or otherwise distributed with a fraudulent identity that exposure is possible. The target and source devices would need to check to see if their respective security identities were ones that were generated by the proper creation authority. In other words, the identities would need to be checked against a creation database, e.g. white list of known good identities.

Identities are usually serial numbers that are created in sequence. These might be guessed. And because the credentials could be faked, the credentials themselves, such as the MAC address or public key, could be checked as well. For example, did the public key presented for a particular security identity associated with a target or source device actually match that in the creation database? If not then the copy protection operation, whatever it is should not proceed. The situation with HDCP is so insecure, that ideally the technology would be replaced. But there are now hundreds of millions of devices in the field and so the content creation industry will be faced with possible content exposure through legacy devices for decades to come.

In addition, the source and target devices are built to certain hardware and software specifications called compliance rules 12 and 22. These are typically part of any security and copy protection systems, and are negotiated with the content creation industry, e.g. Hollywood studios, and other existing security systems. Conditional Access (CA) systems, such as DTCP-IPT™, WMDRM-NDT™, HDCP™, etc., all have compliance rules 12 and 22. The rules 12 and 22 allow one security system to hand-off content to another security system while maintaining a level of protection over the content. But it is difficult for devices to update the rules 12 and 22. For example, as new ways to store content become available, e.g. Blu-ray™ discs, iPOD™s, and tablets, e.g. iPAD™s, it is difficult for the devices to differentiate between these methods especially if it occurs with devices which are added downstream of the device. The original device recorded to an internal hard disk drive, but a device downstream can record to compact disc (CD) or digital versatile discs (DVD). The original security scheme may not have envisioned a detachable medium like a CD or DVD.

Compliance rules 12 may be a different than compliance rules 22 depending on the date of manufacture and when certain technologies were made available and the type of device it is, e.g. target, source, controller, etc. Because of the difficulty of updating the rules 12 and 22, they often cannot be made the same. One will be a different version then the other. Likewise, new ways to transmit content are becoming available. WI-FI or cellphone technology, such as 3G or 4G, the software has difficulty differentiating between such distribution approaches in order to possibly copy control access. As content is copied or streamed from device to device, it is difficult for an originating source or gateway device that received content earlier to maintain existing copy control over content on devices that receive it later, e.g. "downstream" of the originating or gateway device. This is especially true with so called "adaptor" devices. For example, an adaptor dongle can interface with an HDMI™ port and wirelessly transmit content to another dongle which interfaces to an HDMI port on a different device. Wireless transmission may never have been originally conceived by the HDCP security which may have assumed a wired, tethered connection using HDMI. Wireless transmission might allow new possibilities for content theft which might be disallowed under future HDCP compliance rules, but the older rules might not distinguish between wired or wireless transmission. For example, a hack might allow an entire college dormitory to view content sent wirelessly. The technology for devices is changing quickly. And it is difficult to update the security software in order to execute new compliance rules 12 and 22 to accommodate the changing landscape of technology and complexity of device interconnections. HDCP is not realistically fixable because of the huge installed base of legacy devices that cannot be upgraded and that would need to be replaced. The risks are high for the content owners. Delivery to insecure storage media or transmission media could expose content to unintended copying and redistribution and, as a result, cause a loss of revenue for the content owners.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 7 is an example transcoding process from the server to the target consistent with certain embodiments of the present invention.

FIG. 8 is an example transcoding process from the source to the target consistent with certain embodiments of the present invention.

FIG. 9 is an example transcoding process identifying content to target from server consistent with certain embodiments of the present invention.

FIG. 10 is an example of an authentication process consistent with certain embodiments of the present invention.

FIG. 11 is an example of an authentication process including transcoding consistent with certain embodiments of the present invention.

FIG. 13 is an example of a cloud authentication server consistent with certain embodiments of the present invention.

DETAILED DESCRIPTION

Figure 1:
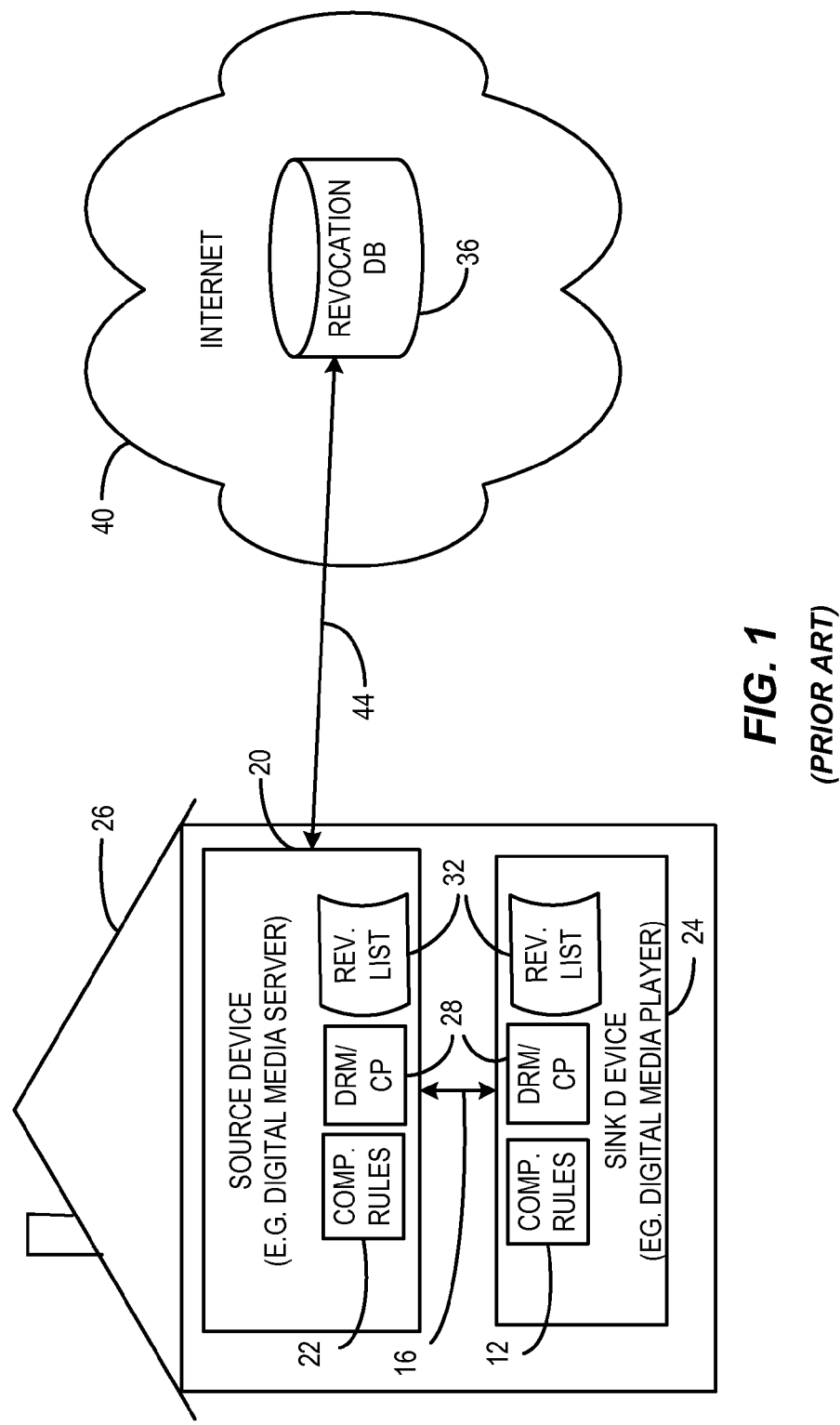
FIG. 1 is an example of a conventional authentication system.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a script, a program module, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. In this discussion, the use of the term "Program" is generally consistent with that of the MPEG-2 Systems standard (ISO/IEC 13818-1). An MPEG-2 Program has the associated Elementary Stream components, such as for example one video Elementary Stream and one or more audio Elementary Streams. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "local" as used herein means two or more devices are within close physical proximity as within a house or apartment and is distinguished from a device residing within the "cloud" within the sense of the term in "cloud computing". The term "source device" and similar terms are used herein with respect to a target device. That is, a "source device" may not actually be the origin of content (e.g. in the case of a television set top box), but is the device from which a target device receives content.

It is desirable to have a way to more quickly and accurately authenticate target and source devices used with security and copy protection technologies against both a negative list, e.g. revocation list, and a positive list, e.g. white list.

In addition, it would be desirable to ensure that the latest compliance rules are in effect.

And in addition, it would be desirable to have an alternate way to do key generation in order to securely deliver content from a source device to a target device in case of a total security breach.

With the speed of technology innovation, it is difficult for existing products to check the latest revocation list and execute the correct copy protection compliance rules for all types of content (e.g., MPEG2 HD and SD, AVC HD and SD, audio type), all resolutions and all copy protection interfaces. Testing of all of the various scenarios is difficult to accomplish. As of this writing, there are no known devices which check for devices on a white list.

However, more and more devices are becoming network capable. The network is getting more and more reliable and with increasing speeds with no end in sight. It is therefore possible for a home entertainment device to check with an authentication server situated within the cloud to make sure that recipient (target or sink) device is appropriately authorized to receive or transmit content from a particular source. This would entail the checking to see if the target device is found in a revocation list maintained in the cloud. Note that also checking the source device by the target device makes it difficult for a hacker to operate with device using a compromised source identity. With devices using a copy protection scheme numbering in the tens of millions and even hundreds of millions, it thereby makes the revocation list potentially very long. Many copy protection schemes have difficulty preventing the blocking of updates to the revocation list. As mentioned previously, in some severe breaches, the devices may actually be checked against a white list—a database of created identities. By using this technique, the "go or no-go" decision making regarding the copy protection operation can be relegated to a more powerful and instantly updated secure authentication server in the cloud.

In addition to authentication, the server in the cloud can check for the latest compliance rules. Compliance rules are behavioral checks for what may be done with content. For example, if content is marked "copy no more", then the source device should not mark it "copy once" and the target device should not record the content. In some cases, selectable output control may be in effect. Certain outputs may no longer be authorized because of a possible security breach or "sunseting" of certain interfaces, e.g. analog interfaces or HDMI with legacy HDCP.

Figure 2:
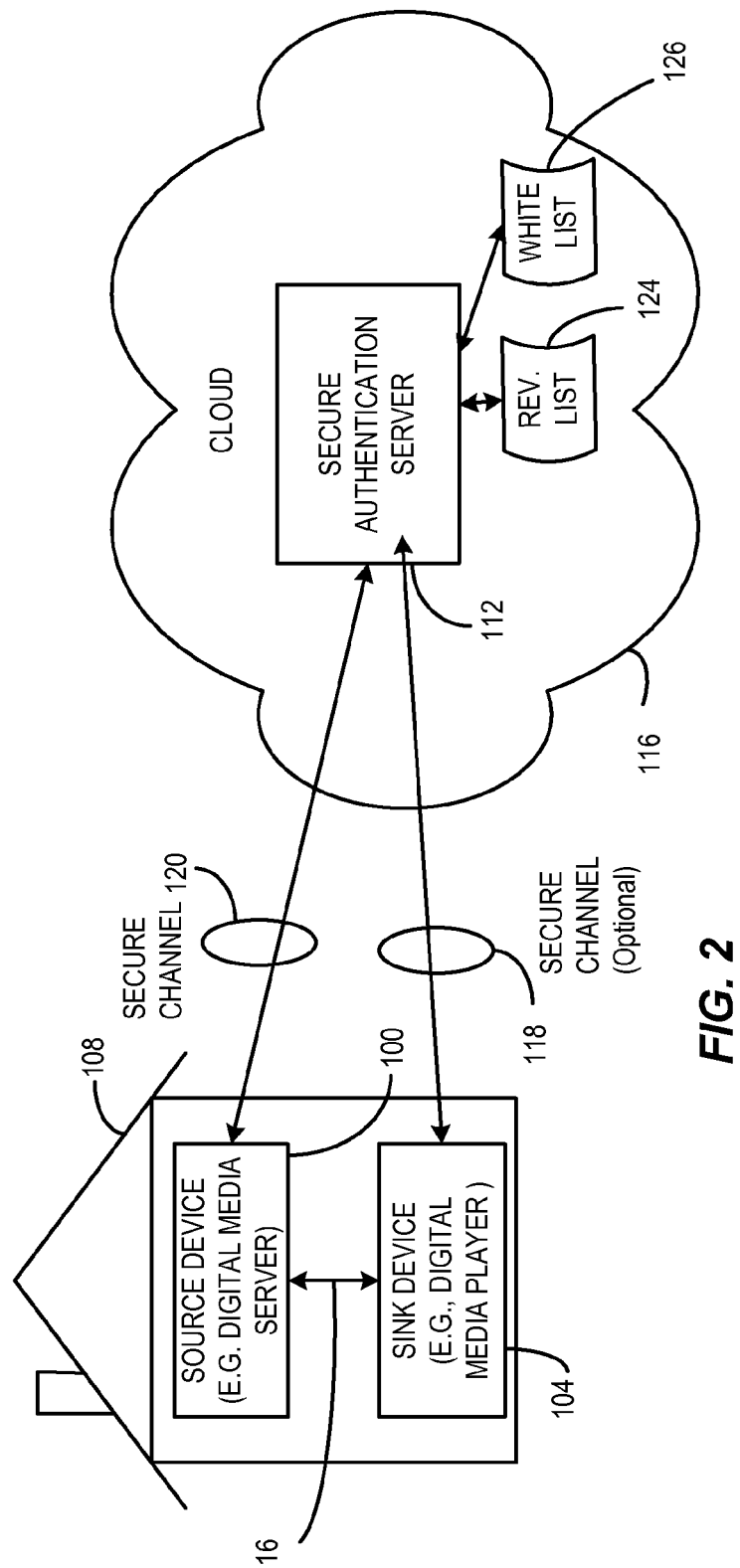
FIG. 2 is an example of an authentication system consistent with certain embodiments of the present invention.

With reference to FIG. 2, a source device such as a television set top box (STB) or digital media server (DMS) 100 is locally connected to a sink device such as a television or digital media player (DMP) 104. This can be a local direct connection or an interconnection through a home entertainment network, for example, each represented by 16.

In accord with such an arrangement, when content is about to be streamed or otherwise transferred or output from device 100 to another device 104, an exchange of credentials takes place. These credentials are forwarded to a secure authentication server 112 in the cloud 116. The transfer used by the source device is carried out using a secure authentication channel 120 with the cloud authentication server 112. An enhanced scenario allows the target device 104 to verify the authenticity of the source device 100 by sending the source credentials to the secure authentication server 112. Source information is provided to establish the secure authentication channel 120 and this information may also be used to provide the authentication server data about the capabilities of the source device. For example, the target information may be used to look-up the model of the device. This may be then used to further analyze the potential risks. For example, if a device has the capability to record content and downloadable applications are readily available for the device, then this device could pose a higher risk and the copy protection operation may be disallowed by the authentication server. In other words, the particular model could be revoked. If a particular type of device is especially insecure, the copy protected operation may be denied regardless of whether or not a particular device were found in the revocation list. In one implementation, this can be performed using Public Key Infrastructure (PKI), for example using RSA or elliptic curve cryptography, and digital certificates. One-time Programmable (OTP) technology using symmetric key technology such as Open Media Security (OMS), as described in ETSI 103 162, may also be used for this purpose. Likewise, the same can be done for the target device. In an enhanced security scenario, the target device 104 receives the credentials from the source device 100 and in a similar fashion sends those in a separate secure channel 118 to the cloud authentication server 112. In this way, it makes it difficult for a hacked source device to interoperate in the home network 108.

Once a sink (target) device 104 or source device 100 has been checked out by the cloud authentication server against revocation list 124 and possibly white list 126, under certain conditions, the device may not need to be checked again allowing non-networked functionality. For example, the source device 100 may be programmed to check for a change in status with the target or sink device 104, and likewise, the target device may be programmed to check for a change in status of the source device on a periodic or random basis.

While a single, cloud authentication server 112 could be kept up-to-date on the latest revocation list 124 for each of the many copy protection schemes, e.g. DTCPT™, HDCP™, CPRM™, Marlin™, MS-WMDRM™, etc., it is anticipated that each security system would likely implement its own server 112

Figure 3:
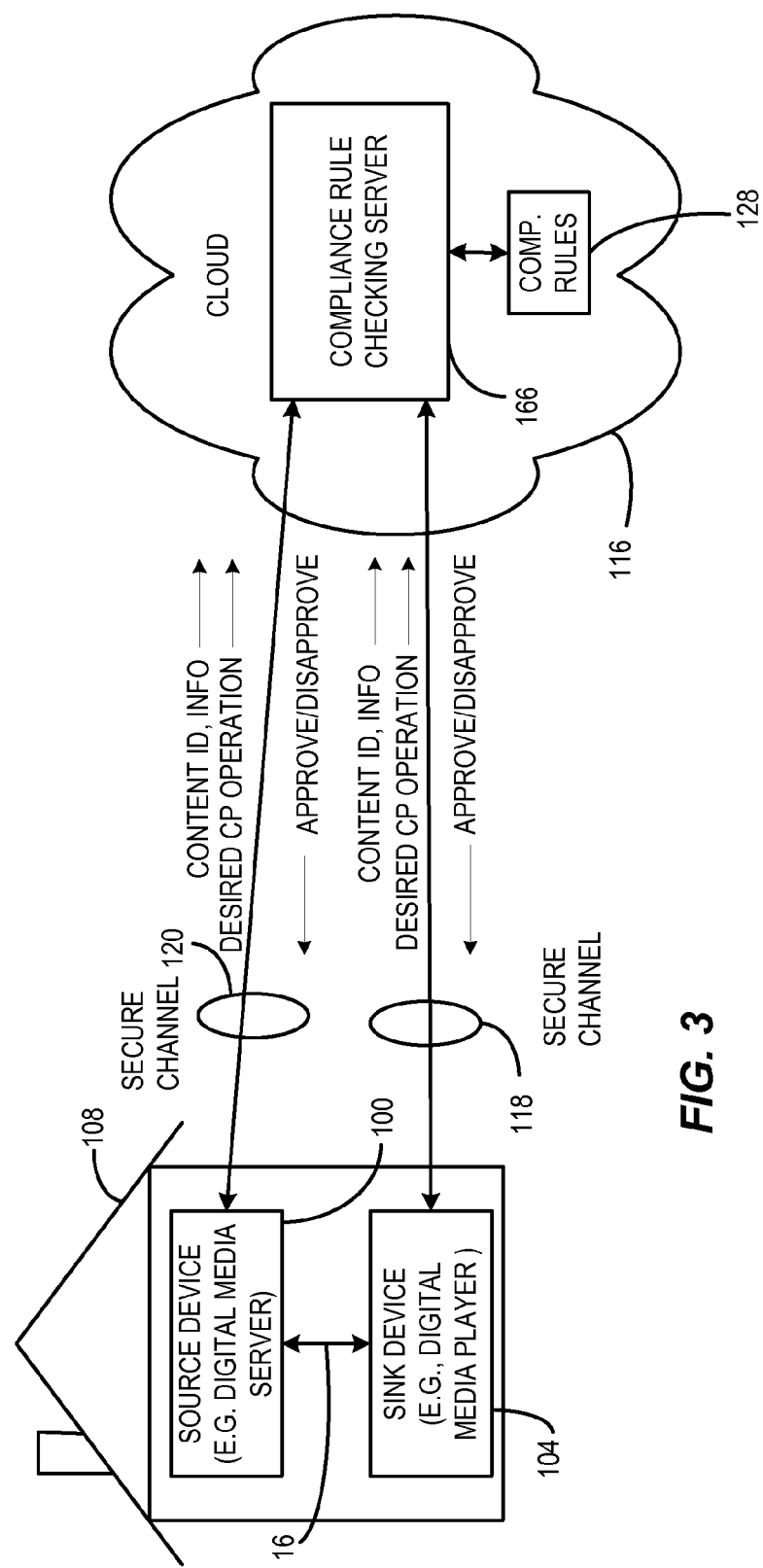
FIG. 3 is an example of a compliance rule checking system consistent with certain embodiments of the present invention.

Referring now to FIG. 3, a source device such as a television set top box (STB) or digital media server (DMS) 100 is locally connected to a sink device such as a television or digital media player (DMP) 104 over link 16. The source device 100 has a secure communication channel 120 with a compliance rule checking server 166 in the cloud 116. The sink device 104 has a similar secure connection 118 to the rule checking server 166 in the cloud 116. This could be the same server 112 as that performing device authentication server, but, in an enhanced scenario, it also verifies compliance rules 128. Verifying compliance rules is a distinct function from device authentication. In order to verify compliance, information about the content is sent as well as the purpose of the streaming (e.g. uncompressed rendering, compressed move, compressed rendering only (copy never or copy no more), compressed copy and rendering, etc.). One manner of compliance check would be to compare the IP addresses of the devices with the geographic inclusion zone of the content. In others words, some content distributed by certain service providers, may only be watched within the geographic zone of influence of that particular service provider. The geographic inclusion zone can be negotiated by a service provider. And the mechanism can check for the latest compliance rule. In another compliance rule example, a transfer may be permitted, but only in the form of a lower resolution copy (a down-res copy) of the content. This enables the source devices utilizing the services of the cloud compliance rules 128 checking to have access to the latest rules concerning content.

Figure 4:
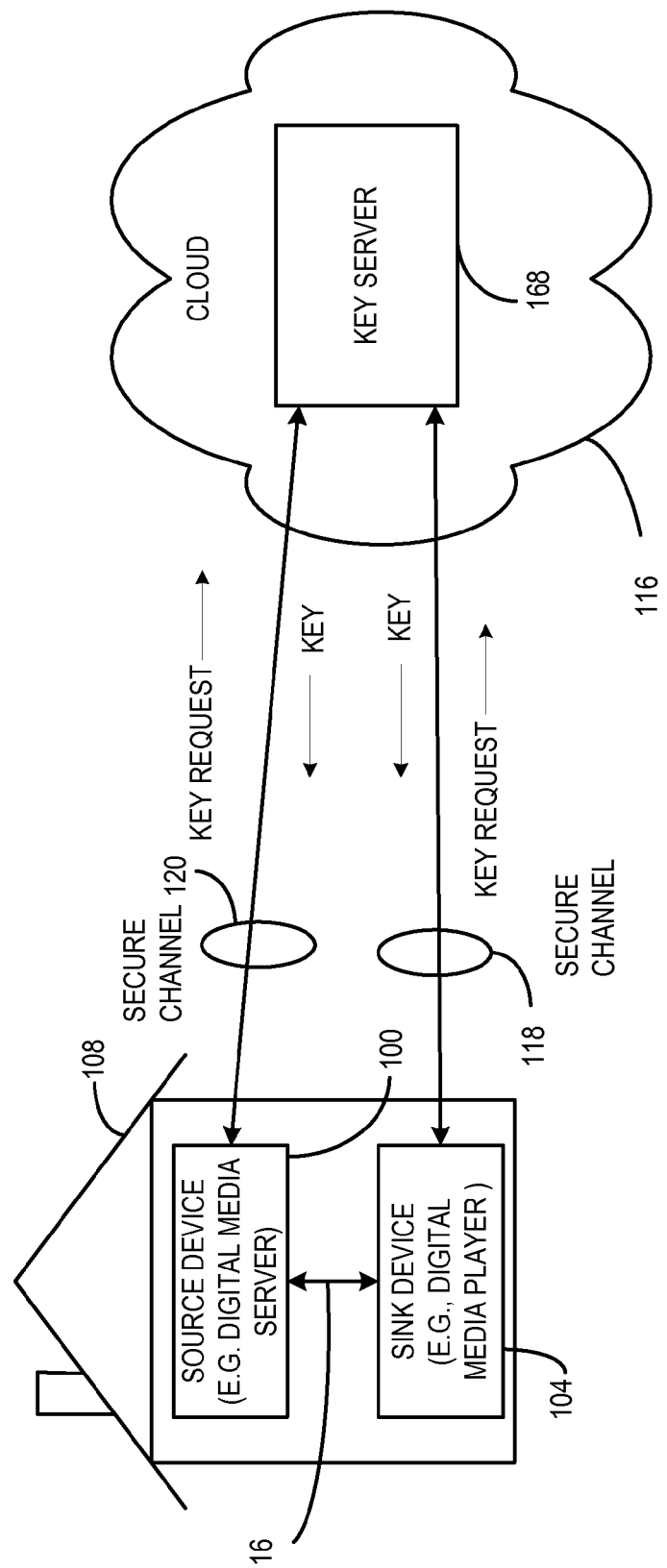
FIG. 4 is an example of a cloud key service system consistent with certain embodiments of the present invention.

Referring now to FIG. 4, a source device 100 is locally connected to a sink device 104 over link 16 with each having a secure channel 120 and 118 respectively with a cloud based key server 168. This could the same server 112 as that performing device authentication server or the compliance rules checking 166, but, in an enhanced scenario, it generates and provides keys that can be used for local link encryption between devices 100 and 104. It is assumed that the devices were checked-out in order to establish the secure channels 120 and 118. The devices did not appear on a revocation list, but appeared on the white list (a creation database), if checked. In order to create an encrypted local link 16, both the source device 100 and the target device 104 must receive the same key or the ability to derive the same key from the cloud based key server 168 using their separate secure channels 120 and 118.

Figure 5:
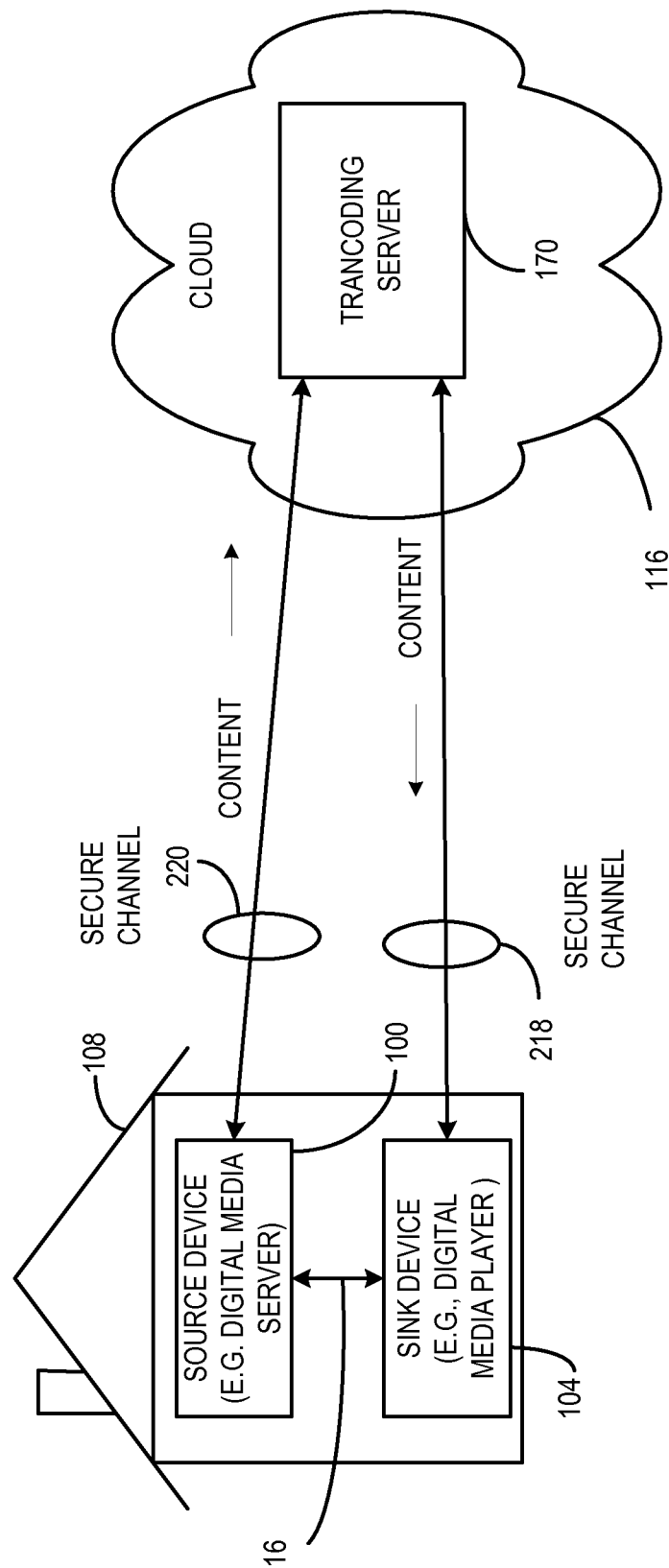
FIG. 5 is an example of a cloud based transcoding system consistent with certain embodiments of the present invention.

Referring now to FIG. 5, a source device 100 is locally connected to a sink device 104 via interconnection 16 with each having a secure channel 220 and 218 respectively with a transcoding server 170 in the cloud 116. The transcoding server can be a service offered by the service provider or may be provided by another service including the server 112 in order to accommodate devices in a customer's home network 108. No content is sent using the local link 116 between the devices 100 and 104. Rather, the source 100 sends the content to the transcoding server 170 which in turns delivers it to the sink (target) device. This has the added advantage of been able to transcode content from one codec to a different codec supported by the sink device 104. In addition, it is possible to "down-resolution" (reduce the resolution) the content if the sink device only supports for example standard definition as opposed to high definition content. And it is possible for the server to more appropriately bit rate adapt to the sink devices using something called "adaptive streaming". The service provider may realize that it already has a copy of the content that user wishes to stream from device 100 to device 104. An instead of streaming the content from the device 100 to the server, the step is entirely skipped. The service provider streams an appropriate copy of the content to device 104 from content in its archives.

Figure 6:
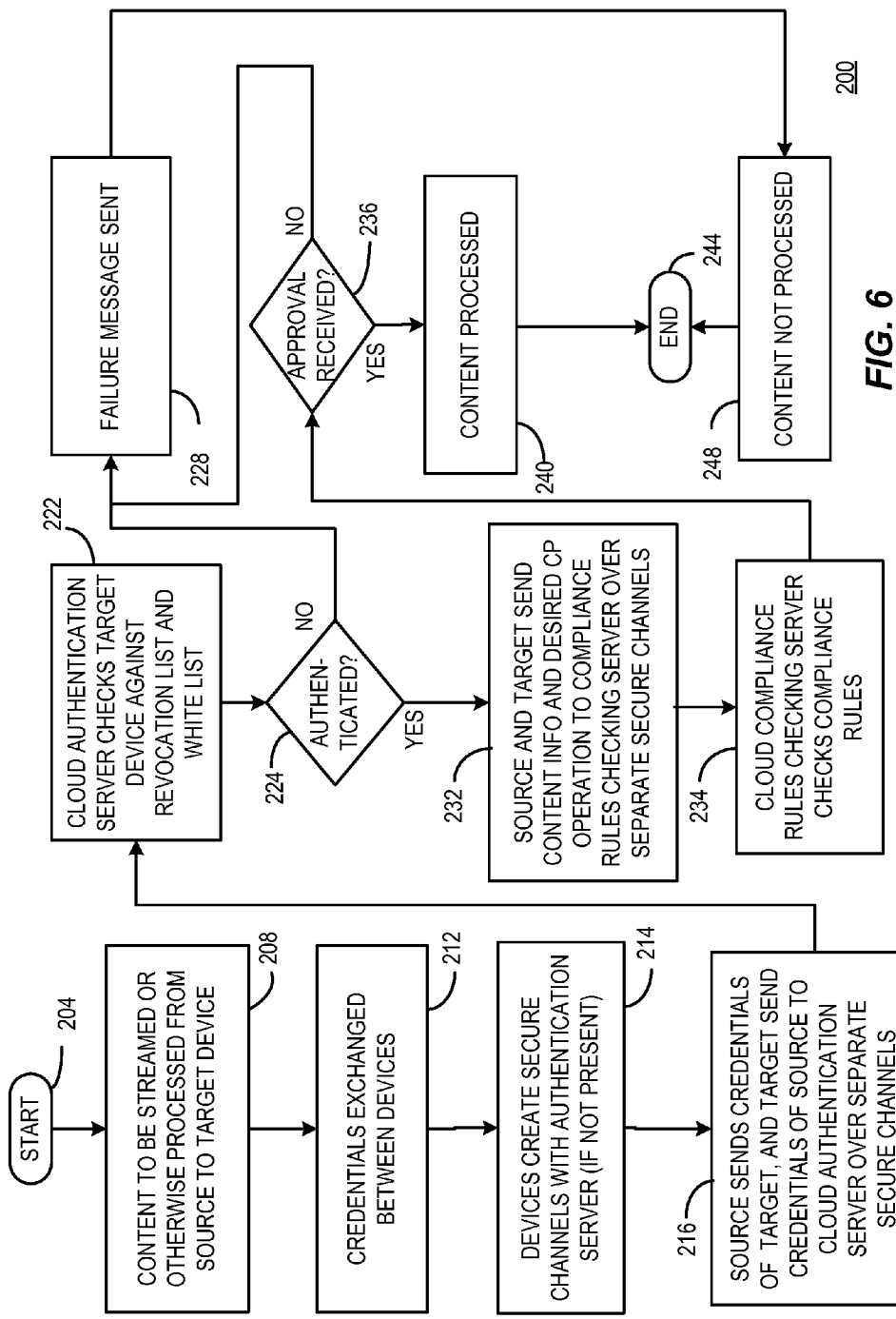
FIG. 6 is an example of an authentication process consistent with certain embodiments of the present invention.

Referring now to FIG. 6, a process 200 is depicted as an example process suitable for use in connection with a method consistent with certain implementations starting at 204. At 208, a determination is made that content is to be streamed or otherwise processed in some manner in which content is transferred from a source device to a locally connected target device. This can be as a result of a user command via a user interface from either the source or target device. Once the transfer is to be implemented, the source and target devices exchange credentials that identify the devices at 212. The source device establishes a secure connection with the authentication server at 214. The source device then sends the credentials of the target device to the cloud authentication server at 216, and at the same time, the target device can optionally send source credentials to the server at 216. This transfer is preferably via a secure channel such as one which is secured using public key encryption or other secure communication mechanism described earlier. At 222, the cloud authentication server checks at least the target device but possibly also the source device against the revocation list and white list (creation database) of authorized devices to determine if the devices are authorized to receive (or send) the content. If so, then the device will be authenticated at 224 and if not, the device will not be authenticated at 224.

In the event that there is no authentication, in this implementation, a failure message is returned from the cloud authentication server at 228 the content is not processed at 248 and operation stops at 244. However, if the cloud authentication server is able to authenticate the device(s) an approval message is returned to the source device at 232. At this stage, the source and target devices can continue processing with the compliance rules checking server at 232. This server may the same as the authentication server, however it executing a different role at this point. Content information and the copy protected operation desired is sent to the cloud compliance rules checking server. The server checks the compliance rules at 234. If no response or a failure response is received from the compliance rules checking server at 228 and the process is stopped at 244. If the compliance rules allow the operation then the process can be carried out according to these parameters at 240. The process ends at 244. If the approval was not received, the content is not processed by the source at 248 before ending the process at 244. In the event of an authentication or compliance rule checking failure, any of a number of actions can be carried out including, but not limited to, providing the user with a message indicating that the target device appears on a revocation list or that the operation is not allowed.

The cloud authentication server could also manage the client keys for a particular system that may be required as mentioned above. For example, if Content Protection Recordable Media (CPRM) is not in the source device itself, CPRM keys could be received from the cloud transcoding server for use in the local link. In another example, content could be streamed to the cloud authentication server for encryption and sent back to the source device for output over an interface to the target device. The cloud authentication server in essence would proxy the transaction for the source device. In this manner, the source device would not need to have any of the specific keys itself. This is depicted in FIG. 7 as process 300.

In process 300 starting at 304, it is assumed that the devices have been authenticated and possibly that the compliance rules have been checked either locally or on server in a processed described above. The content is sent to the cloud transcoding server at 308 to proxy the encryption or other content modification process (e.g., down-res) on behalf of the source device at 312 and then returns a suitable copy of the content to the source device for delivery to the target device at 316. The process ends at 320.

In FIG. 8, starting with the same assumptions, process 300 is modified to 330 so that the transcoding server delivers content to the cloud authentication server at 315 and then the server encrypts or modifies the content and sends the content to the target device at 334. The process ends at 320.

In FIG. 9, starting with the same assumptions, process 300 is modified to 350 so that the content does not need to be uploaded to the transcoding server at 310, but is merely identified. The transcoding server delivers content directly to the target device at 356. The process ends at 320.

Ideally, the client interface to the cloud authentication server is executed in a tamper proof device such as a device that cannot be easily modified and with no master keys exposed might suffice.

In certain preferred implementations, the target device is authenticated by using public key infrastructure (PKI) and digital certificates. Also, the credentials, content information and the purpose of transmission are forwarded to the compliance rules checking server to implement copy protection compliance rules. The target device may be re-authenticated when there is any status change detected in the device. Further, the cloud authentication server can manage the client keys, by providing keys for local encryption or may actually encrypt the content on behalf of the source device. Therefore, the source device does not have to manage keys for different recipient devices.

Turning now to FIG. 10, an example process 400 for operation of a source device starts at 402. At 406, the source and target exchange credentials and the credentials and information about the content is sent to the cloud authentication server. At 410, if no authentication is received within a prescribed time, the process ends at 414—possibly after taking an action of displaying a message or inactivating the target device. If the target device is authenticated by the cloud authentication server at 410, the authentication message is received at 418. In certain embodiments, rules for copy protection management and other information may also be received at 422. These rules and other information are interpreted at 426 and the content is sent to the target device at 430 after which the process ends at 414.

Turning now to FIG. 11, a more specific example process 500 for operation of a source device starts at 502. At 406, the source and target exchange credentials and the credentials is sent to the cloud authentication server. At 410, if no authentication is received within a prescribed time, the process ends at 514—possibly after taking an action of displaying a message or inactivating the target device. If the target device is authenticated by the cloud authentication server at 410, the authentication message is received at 418. In certain embodiments, rules for copy protection management and other information may also be received and applied at 422. These rules and other information are interpreted and if the transaction is not permitted at 526 the process ends at 514. In this example case, the instructions are to permit transfer of the content at reduced resolution as an analog signal. Thus, at 526 control passes to 530 to determine if a transcoding server is available. If not, the control passes to 534 where the content is locally processed as a customer premise (CP) operation and the process ends at 514. But if a transcoding server is available at 530, the content is transcoded remotely at 538 and the transcoded content is sent to the target device at 538 using the prescribed reduced resolution analog output after which the process ends at 514.

Figure 12:
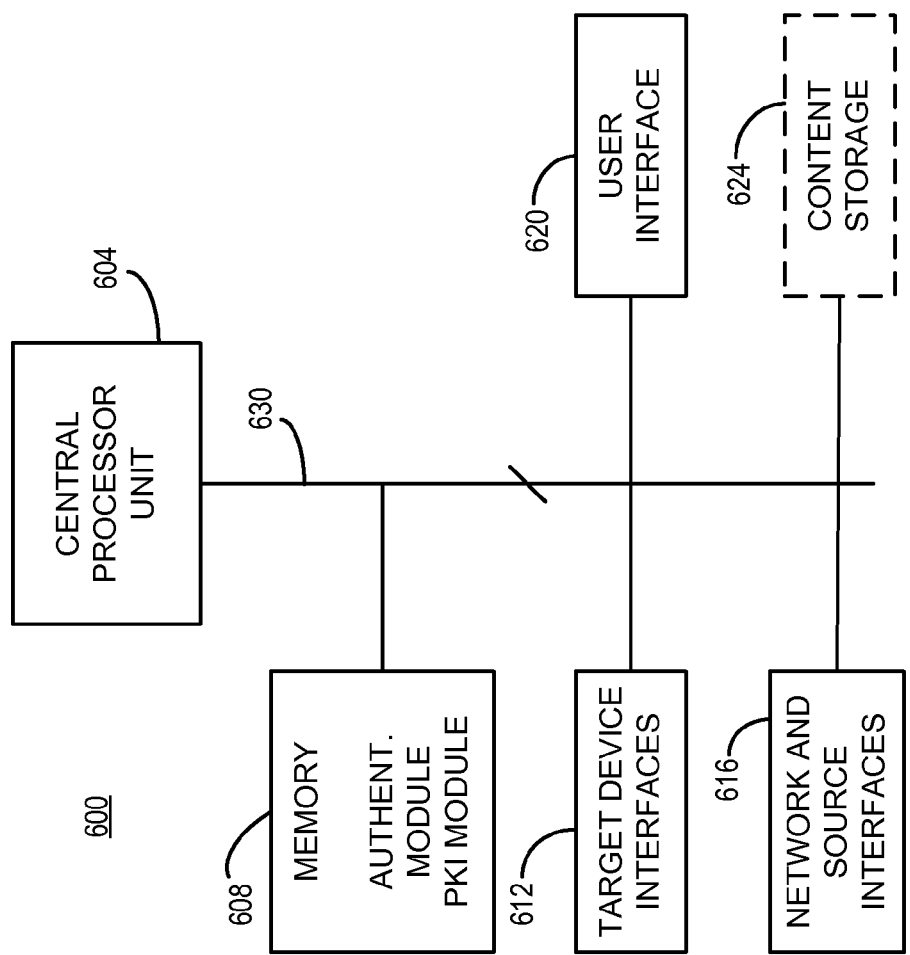
FIG. 12 is an example of a source device consistent with certain embodiments of the present invention.

With reference to FIG. 12, a source device 600 consistent with certain implementations is depicted in which a central processor unit 604 is coupled to associated memory such as flash memory or any other suitable electronic storage medium 608. This memory, among other things stores a software module that carries out the authentication process used in transferring credentials to and receiving communication from the cloud authentication server and a PKI module or other security module used for assuring that the communications with the cloud authentication server are secured. The device 600 includes one or more target device interfaces such as an HDMI or analog interface 612 as well as network (i.e., Internet) where the physical infrastructure could be a wireless Local Area Network (WLAN), Power-line Communications (PLC) or Multimedia over Coax Alliance (MoCA) or other physical infrastructure, and possibly source interfaces (e.g., a coaxial RF cable television interface) 616. A user interface 620 permits users to control device 600 in accord with its designed operation. Depending upon the nature of the source device it may include content storage 624 or a player such as a BluRay™ player or the like. The processor 604 communicates with the other components described using one or more suitable communication buses depicted generally as 630.

With reference to FIG. 13, a general purpose computer can be functioned to serve as a cloud authentication server, a compliance rules checking server, or key server and can generally be depicted as 700 consistent with certain implementations which is depicted as having one or more central processor units 704 are coupled to associated memory such Random Access Memory or any other suitable electronic storage medium 708. This memory, among other things stores a software module that carries out the authentication server authentication process used to authenticate devices and a PKI module or other security module used for assuring that the communications with devices using services of the cloud authentication server, compliance rules checking server or key server. The device 700 further includes one or more network interfaces (i.e., Internet) 712 and a revocation database 720 that stores a list of revoked devices and a creation database 740, if need be, as well as other information as discussed previously that can be transferred to the source devices using the server's services. The processor 704 communicates with the other components described using one or more suitable communication buses depicted generally as 730. Computer 700 could also provide transcoding through transcoder 750 in certain implementations.

Thus, in certain implementations, a method of authenticating a device involves establishing a local connection between a local target device and a local source device; at the source device, obtaining credentials of the target device via the local connection; at the source device, sending the credentials to a cloud authentication server via a secure communication channel; at the cloud authentication server, checking the credentials of the target device against a database of known good devices; at the source device, receiving a message from the cloud authentication server via the secure communication channel, said message indicating that the target device is authenticated; and delivering content from the source device to the target device on the condition that the target device is authenticated.

In another implementation, a method of communication involves establishing a local connection between a local target device and a local source device; at the source device, obtaining credentials of the target device via the local connection; at the source device, sending the credentials to a cloud authentication server via a secure communication channel; at the source device, receiving a message from the cloud authentication server via the secure communication channel, said message indicating that the target device is authenticated; and delivering content from the source device to the target device on the condition that the target device is authenticated.

In certain implementations, at the target device, obtaining credentials of the source device via the local connection, sending the source's credentials to the cloud authentication server via a second secure communication channel, and receiving the content from the source device on the condition that the source device is authenticated. In certain implementations, at the target device, sending information identifying content to be transferred from the source device to the target device to the cloud authentication server.

Another method of communication involves establishing a local connection between a local target device and a local source device; at the source device, obtaining credentials of the target device via the local connection; at the source device, sending the credentials to a cloud authentication server via a secure communication channel; at the target device, obtaining credentials for the source device via the local connection; at the target device, sending the credentials to a cloud authentication server via a secure communication channel; at the source device, receiving a message from the cloud authentication server via the secure communication channel, said message indicating that the target device is authenticated; at the target device, receiving a message from the cloud authentication server via the secure communication channel, said message indicating that the source device is authenticated; and delivering content from the source device to the target device on the condition that both the target device and source device are authenticated.

Another method of communication involves establishing a local connection between a local target device and a local source device; at the source device, obtaining credentials of the target device via the local connection; at the source device, sending the target credentials to a cloud authentication server via a secure communication channel; at the source device, receiving a message from the cloud authentication server via the secure communication channel, said message indicating that the target device is authenticated and delivering a key; at the target device, using a secure communication channel, receiving a message from the cloud authentication server via the secure communication channel, said message delivering the same key; and delivering encrypted content from the source device to the target device on the condition that the devices are authenticated and the content being encrypted with the key.

In certain implementations, the source device receives information from a compliance rule checking server providing constraining conditions upon which the identified content can be delivered to, rendered by, or stored by the target device, and where the delivering, rendering or storing is carried out according to the constraining conditions. In certain implementations, the constraining conditions comprise a requirement to reduce resolution of video content in the identified content. In certain implementations, the constraining conditions comprise copy protection rules. In certain implementations, the constraining conditions comprise encryption keys used to encrypt the identified content. In certain implementations, the process further involves at the source device, sending the content to the cloud transcoding server via the secure communication channel; and at the source device, receiving the content back from the cloud transcoding server.

A content source device consistent with certain implementations has a local connection interface adapted for making a local connection to a local target device and an Internet interface. A programmed processor is programmed to: obtain credentials of the local target device via the local connection; send the credentials to a cloud authentication server via a secure communication channel; receive a message from the cloud authentication server via the secure communication channel, said message indicating that the target device is authenticated and authorized to receive the identified content; and deliver the identified content from the source device to the target device only on the condition that the target device is authenticated.

In certain implementations, information identifying content to be transferred from the source device to the target device is sent to the cloud authentication server. In certain implementations, the source device receives information from the cloud compliance rule checking server constraining conditions upon which the identified content can be delivered to the target device, and where the delivering is carried out according to the constraining conditions. In certain implementations, the constraining conditions comprise a requirement to reduce resolution of video content in the identified content. In certain implementations, the constraining conditions comprise copy protection rules. In certain implementations, the constraining conditions comprise encryption keys used to encrypt the identified content. In certain implementations, the processor is further programmed to: send the identified content to the cloud transcoding server via the secure communication channel; and receive the identified content in an encrypted form back from the cloud transcoding server.

A content source device according to certain implementations has a local connection interface adapted for making a local connection to a local target device and an Internet interface. A programmed processor is programmed to: obtain credentials of the local target device via the local connection; send the credentials to a cloud authentication server via a secure communication channel; receive a message from the cloud authentication server via the secure communication channel, said message indicating that the target device is authenticated and authorized to receive the identified content; send the identified content to the cloud authentication server via the secure communication channel; and receive the identified content in an encrypted form back from the cloud authentication server; deliver the identified content in encrypted form from the source device to the target device only on the condition that the target device is authenticated; send information identifying content to be transferred from the source device to the target device to the cloud authentication server.

In certain implementations, the source device receives information from cloud server constraining conditions upon which the identified content can be delivered to the target device, and where the delivering is carried out according to the constraining conditions. In certain implementations, the constraining conditions comprise a requirement to reduce resolution of video content in the identified content. In certain implementations, the constraining conditions comprise copy protection rules. In certain implementations, the constraining conditions comprise encryption keys used to decrypt the identified content.

Any of the above methods can be implemented using a tangible storage device such as a non-transitory computer readable storage device storing instructions which, when executed on one or more programmed processors, carry out a method. In this case, the term non-transitory is intended to preclude transmitted signals and propagating waves, but not storage devices that are erasable or dependent upon power sources to retain information.

Those skilled in the art will recognize, upon consideration of the above teachings, that certain of the above exemplary embodiments are based upon use of one or more programmed processors programmed with a suitable computer program. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage devices including, but not limited to non-transitory storage media (where non-transitory is intended only to preclude propagating signals and not signals which are transitory in that they are erased by removal of power or explicit acts of erasure) such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping, time outs, etc. can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of communication, comprising:
   establishing a local communication connection between a local target device and a local source device;
   at the source device, obtaining target device credentials directly from the target device via the local connection, where the target device credentials comprises information from a creation authority that identifies the target device;
   at the source device, sending the credentials to a cloud authentication server via a first secure communication channel;
   at the target device, obtaining source device credentials via the local connection;
   at the target device, sending the source device credentials to the cloud authentication server via a second secure communication channel;
   at the source device, receiving a message from the cloud authentication server via the first secure communication channel, said message indicating that the target device is authenticated based upon comparison of the target device credentials to a database of known good devices based upon data from a creation database and based upon comparison of the credentials to a revocation list of devices that are not to be authenticated;
   at the target device, receiving a message from the cloud authentication server via the second secure communication channel, said message indicating that the source device is authenticated;
   at the source device, sending the target device credentials, content identification and purpose of a transfer of the content from the source device to a cloud compliance rules checking server;
   at the source device, receiving a message from the cloud compliance rules checking server that approves content to be sent from the source device to the target device; and
   delivering content from the source device to the target device on the condition that both the target device and source device are authenticated and compliance rules are approved.

2. A method of communication, comprising:
   establishing a local communication connection between a local target device and a local source device;
   at the source device, obtaining target device credentials directly from the target device via the local connection, where the target device credentials comprises information from a creation authority that identifies the target device;
   at the source device, sending the target device credentials to a cloud authentication server via a first secure communication channel;
   at the target device, obtaining source device credentials via the local connection;
   at the target device, sending the source device credentials to the cloud authentication server via a second secure communication channel;
   at the source device, receiving a message from the cloud authentication server via the first secure communication channel, said message indicating that the target device is authenticated based upon comparison of the target device credentials with from a creation database and based upon checking the target device credentials against a revocation list of devices that are not to be authenticated, said message further delivering a key;
   at the target device, receiving a message from the cloud authentication server via the second secure communication channel, said message indicating that the source device is authenticated;
   at the target device, using the second secure communication channel, receiving a message from the cloud authentication server via the second secure communication channel, said message delivering the same key;
   at the source device, sending the target device credentials, content identification, constraining conditions and purpose of a transfer of the content from the source device to a cloud compliance rules checking server;
   at the source device, receiving a message from the cloud compliance rules checking server that approves content to be sent from the source device to the target device; and
   delivering encrypted content from the source device to the target device on the condition that the devices are authenticated, and the compliance rules are approved and the content is encrypted with the key.

3. The method according to claim 2, further comprising the source device receiving information from the compliance rules checking server defining modified constraining conditions upon which the identified content can be delivered to, rendered by, or stored by the target device, and where the delivering, rendering or storing is carried out according to the modified constraining conditions.

4. The method according to claim 3, where the constraining conditions comprise a requirement to reduce resolution of video content in the identified content.

5. The method according to claim 3, where the constraining conditions comprise copy protection rules.

6. The method according to claim 3, where the constraining conditions comprise encryption keys used to encrypt the identified content.

7. The method according to claim 2, further comprising:
- at the source device, sending the content to a cloud transcoding server via the first secure communication channel, where the cloud transcoding server transcodes the content from compatibility with one codec to compatibility with a different codec; and
- at the source device, receiving the transcoded content back from the cloud transcoding server.

8. A non-transitory computer readable storage device storing instructions which, when executed on one or more programmed processors, carry out a method comprising:
- establishing a local communication connection between a local target device and a local source device;
- at the source device, obtaining target device credentials directly from the target device via the local connection, where the target device credentials comprises information from a creation authority that identifies the target device;
- at the source device, sending the target devices credentials to a cloud authentication server via a first secure communication channel;
- at the target device, obtaining source device credentials for the source device via the local connection;
- at the target device, sending the source device credentials to the cloud authentication server via a second secure communication channel;
- at the source device, receiving a message from the cloud authentication server via the first secure communication channel, said message indicating that the target device is authenticated based upon comparison of the target device credentials with from a creation database and based upon checking the target device credentials against a revocation list of devices that are not to be authenticated, said message further delivering a key;
- at the target device, receiving a message from the cloud authentication server via the second secure communication channel, said message indicating that the source device is authenticated;
- at the target device, using the second secure communication channel, receiving a message from the cloud authentication server via the second secure communication channel, said message delivering the same key;
- at the source device, sending the target device credentials content identification, constraining conditions and purpose of a transfer of the content from the source device to a cloud compliance rules checking server;
- at the source device, receiving a message from the cloud compliance rules checking server that approves content to be sent from the source device to the target device; and
- delivering encrypted content from the source device to the target device on the condition that the devices are authenticated, and the compliance rules are approved and the content is encrypted with the key.

9. A content source device, comprising:
- a local connection interface adapted for making a local connection to a local target device;
- a network interface;
- a programmed processor programmed to:
  - establish a local communication connection using the network interface between a local target device and a local source device, where the connection is via a home entertainment network;
  - obtain target device credentials directly from the local target device via the local connection, where the target device credentials comprises information from a creation authority that identifies the target device, where the target device is configured to obtain source device credentials for the source device via the local connection and send the source device credentials to a cloud authentication server via a second secure communication channel;
  - send the target device credentials to the cloud authentication server via a first secure communication channel;
  - receive a message from the cloud authentication server via the first secure communication channel, said message indicating that the target device is authenticated and authorized to receive the identified content based upon comparison of the target device credentials with a revocation list and with a list of known good devices based upon a creation database, where the target device is configured to receive a message from the cloud authentication server via the second secure communication channel, said message indicating that the source device is authenticated;
  - send the target device credentials, content identification and purpose of a transfer of the content from the source device to the target device to a cloud compliance rules checking server;
  - receive a message from the cloud compliance rules checking server that approves content to be sent from the source device to the target device; and
  - deliver the identified content from the source device to the target device only on the condition that the target device is authenticated and compliance rules are approved.

10. The device according to claim 9, where information identifying content to be transferred from the source device to the target device is sent to the cloud authentication server.

11. The device according to claim 10, where the source device receives information from the cloud compliance rules checking server providing constraining conditions upon which the identified content can be delivered to the target device, and where the delivering is carried out according to the constraining conditions.

12. The device according to claim 11, where the constraining conditions comprise a requirement to reduce resolution of video content in the identified content.

13. The device according to claim 11, where the constraining conditions comprise copy protection rules.

14. The device according to claim 11, where the constraining conditions comprise encryption keys used to encrypt the identified content.

15. The device according to claim 9, where the processor is further programmed to:
- send the identified content to a cloud transcoding server via the first secure communication channel, where the cloud transcoding server transcodes the content from compatibility with one codec to compatibility with a different codec; and receive the transcoded content in an encrypted form back from the cloud transcoding server.

16. A content source device, comprising:

a local connection interface adapted for making a local communication connection to a local target device;

an Internet interface;

a programmed processor programmed to:

establish a direct local communication connection using the local connection interface between a local target device and a local source device, where the connection is via a home entertainment network;

obtain target device credentials directly from the local target device via the local connection;

send the target device credentials to a cloud authentication server via a first secure communication channel, where the target device credentials comprises information from a creation authority that identifies the target device, where the target device is configured to obtain source device credentials for the source device via the local connection and send the source device credentials to the cloud authentication server via a second secure communication channel;

receive a message from the cloud authentication server via the first secure communication channel, said message indicating that the target device is authenticated and authorized to receive the identified content based upon comparison of the target device credentials with a revocation list and with a list of known good devices based upon a creation database, where the target device is configured to receive a message from the cloud authentication server via the second secure communication channel, said message indicating that the source device is authenticated;

send the identified content to the cloud authentication server via the first secure communication channel;

receive the identified content in an encrypted form back from the cloud authentication server;

send the target device credentials, content identification and purpose of a transfer of the content to the target device to a cloud compliance rules checking server;

receive a message from the cloud compliance rules checking server that approves content to be sent to the target device;

deliver the identified content in encrypted form from the source device to the target device only on the condition that the target device is authenticated and compliance rules are approved; and send information identifying content to be transferred from the source device to the target device to the cloud authentication server.

17. The device according to claim 16, further comprising the source device receiving information from a cloud server providing constraining conditions upon which the identified content can be delivered to the target device, and where the delivering is carried out according to the constraining conditions.

18. The device according to claim 17, where the constraining conditions comprise a requirement to reduce resolution of video content in the identified content.

19. The device according to claim 17, where the constraining conditions comprise copy protection rules.

20. The device according to claim 17, where the constraining conditions comprise encryption keys used to decrypt the identified content.

\* \* \* \* \*